United States Patent Office 2,794,008
Patented May 28, 1957

2,794,008

PLASTICIZED ALKOXY-SUBSTITUTED FORMALDEHYDE REACTION PRODUCTS

Victor W. Ginsler, Toledo, Ohio, assignor, by mesne assignments, to Allied Chemical & Dye Corporation, New York, N. Y., a corporation of New York No Drawing. Application May 12, 1950, Serial No. 161,735

12 Claims. (Cl. 260—21)

The invention relates to plasticized alkoxy-substituted reaction products of formaldehyde with a nitrogenous compound such as urea or melamine.

Alkoxy-substituted reaction products of formaldehyde and urea are of great commercial value for use in coating compositions. However, an alkoxy-substituted urea-formaldehyde reaction product has not been used commercially heretofore as the principal ingredient in a coating composition. It is well-known that an unplasticized composition in which such a reaction product is the principal ingredient produces coatings that are so brittle as to be of no practical value. Thus, although large quantities of alkoxy-substituted urea-formaldehyde reaction products have been used in commercial baking enamels, in order to prevent such enamels from being too brittle for practical use they have contained about two parts by weight of an alkyd resin for each part of a urea-formaldehyde reaction product. The alkyd resin in such an enamel serves as a plasticizer, but it is a relatively ineffective plasticizer because about two parts of the alkyd resin are required for each part of the urea-formaldehyde reaction product in order to avoid excessive brittleness.

For many years there has existed a need for a plasticized alkoxy - substituted urea - formaldehyde reaction product that does not contain such an excessive proportion of plasticizer. A need has existed for a more effective plasticizer that would make it possible to take full advantage of the speed of cure, weather resistance and other good properties of a urea-formaldehyde resin by using a more predominant proportion of the urea-formaldehyde reaction product in the composition. Moreover, there are a number of applications in which the use of an alkyd resin is not desirable. For example, virtually the only alkyd resins that produce satisfactory coatings are those made from phthalic anhydride; yet an alkyd resin made from phthalic anhydride cannot be used in coating the interior of a food container, because an alkyd resin made from phthalic anhydride imparts an objectionable taste to the food in the container. Thus, the fact that it has been necessary heretofore to use a large proportion of an alkyd resin to plasticize a small proportion of an alkoxy-substituted urea-formaldehyde reaction product has been a serious limitation on the usefulness of such a reaction product.

The principal object of the invention is to provide a novel, highly effective type of plasticizer for an alkoxy-substituted reaction product of formaldehyde with a nitrogeneous compound such as urea or melamine. More specific objects and advantages are apparent from the description, which illustrates and discloses but is not intended to limit the scope of the invention.

The invention makes it possible to produce a plasticized alkoxy-substituted formaldehyde reaction product that is free from objectionable taste and is either air-drying, or completely stable so that it dos not change color during baking.

The invention consists in a plasticized composition comprising (a) an alkoxy-substituted reaction product of formaldehyde with a substance whose molecule has a plurality of NH$_2$ groups each connected to a carbon atom which in turn is connected by a double bond to an atom having an atomic weight from 14 to 16, and (b) a monomeric ester of components comprising (1) an aliphatic monocarboxylic acid whose molecule has at least four carbon atoms and (2) a substance whose molecule has at least three alcoholic hydroxy groups; said ester being compatible with said reaction product and having in its molecule at least two free alcoholic hydroxy groups of the last-mentioned substance.

ALKOXY-SUBSTITUTED FORMALDEHYDE REACTION PRODUCT

In the preparation of an alkoxy-substituted reaction product of formaldehyde with a substance whose molecule has a plurality of NH$_2$ groups each connected to a carbon atom which in turn is connected by a double bond to an atom having an atomic weight from 14 to 16 (i. e., oxygen or nitrogen) that may be used in a plasticized composition embodying the invention, such a substance may be reacted with formaldehyde or a polymer thereof such as paraformaldehyde. When used for such a reaction, paraformaldehyde is considered to split up so that the substance actually taking part in the reaction is formaldehyde. Ordinary commercial formalin (i. e., an aqueous solution comprising 37 percent by weight of formaldehyde) is usually employed. It is believed that one molecule of formaldehyde combines with one molecule of water to form methylene glycol and that it is the methylene glycol molecule that reacts with the substance whose molecule contains a plurality of NH$_2$ groups, by condensing with one of the NH$_2$ groups to form a methylol derivative of the substance. The methylol derivative resulting from such condensation may then be converted to an alkoxy-substituted reaction product by reaction with an alcohol (i. e., by further condensation between an alcoholic hydroxy group and the OH group of a methylol radical).

A substance whose molecule has a plurality of NH$_2$ groups each connected to a carbon atom which in turn is connected by a double bond to a nitrogen or oxygen atom may be (1) a substance whose molecule has a plurality of NH$_2$ groups, each attached to a carbon atom, contained in a linear chain, which in turn is connected by a double bond to a nitrogen or oxygen atom, or (2) a substance whose molecule has a plurality of NH$_2$ groups, each attached to a carbon atom, contained in a ring, which in turn is connected by a double bond to a nitrogen or oxygen atom.

A substance (1) which reacts with formaldehyde to form a methylol derivative may be (a) a substance in which each carbon atom that is connected to an NH$_2$ group is connected by a double bond to an oxygen atom, e. g., urea

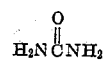

biuret

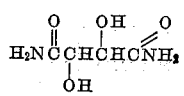

a polyamide such as tartramide

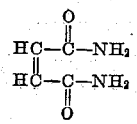

maleamide $$\begin{array}{c} O \\ \| \\ HC-C-NH_2 \\ \| \\ HC-C-NH_2 \\ \| \\ O \end{array}$$

or phenyliminodiacetamide

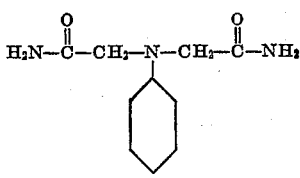

a diureido alkane, e. g., ethylene diurea

or 1,2-propylene diurea

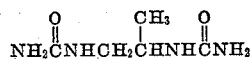

a diureido alkene such as crotonylidene diurea

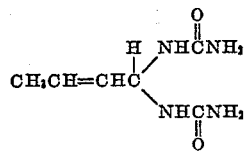

a di-ureidoalkyl ether such as beta, beta'-di-ureidoethyl ether

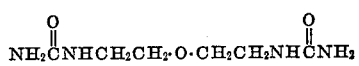

or gamma, gamma'-di-ureidopropyl ether

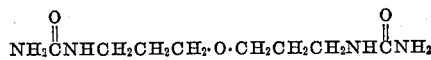

a di-ureidoalkyl polyether such as triethylene glycol diurea

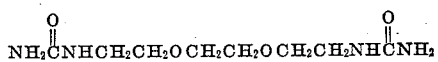

an aliphatic polyamide having urea-end groups; a mono- or polyhydroxy derivative of any of the above-mentioned aliphatic di-ureido compounds in which each hydroxy group is attached to a carbon atom to which no urea group is attached, such as 2-hydroxy trimethylene diurea

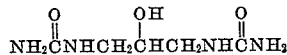

a diurethane such as diethylene glycol dicarbamate

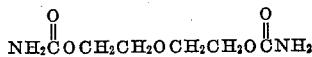

or triethylene glycol dicarbamate

or a triurea such as diethylene triurea

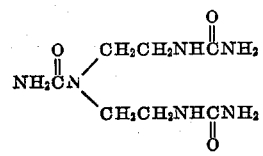

or (b) a substance in which there is not more than one NH₂ group connected to each carbon atom which in turn is connected by a double bond to a nitrogen atom, e. g., biguanide

or dicyandiamidine

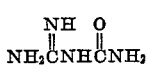

A substance (2) which reacts with formaldehyde to form a methylol derivative may be (a) a substance whose molecule has a plurality of NH₂ groups each attached to a triazole ring, such as guanazole

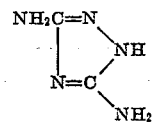

1-phenyl guanazole

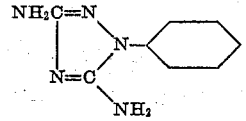

4-aminoguanazole

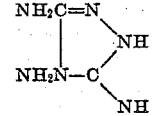

1-carbamyl guanazole

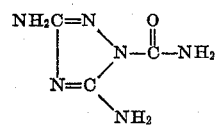

1-guanyl guanazole

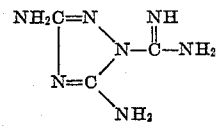

1-acetyl guanazole

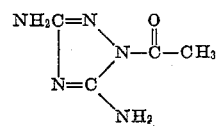

or 1-benzoyl guanazole

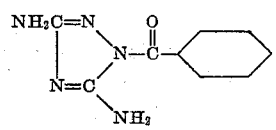

(b) a substance whose molecule contains a plurality of NH₂ groups each attached to a diazine ring, e. g., a pyrimidine such as 2,4-diamino-6-hydroxy pyrimidine

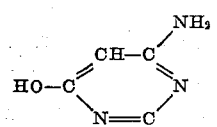

or a quinazoline such as 2,4-diaminoquinazoline

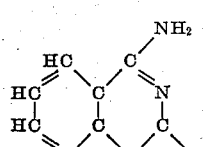

or (c) a substance whose molecule contains a plurality of NH₂ groups each attached to a triazine ring, e. g., a diamine triazine (i. e., a guanamine) such as acetoguanamine

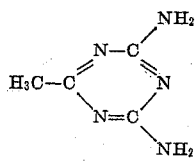

benzoguanamine

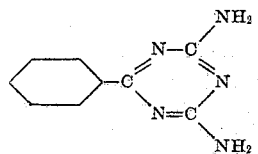

or formoguanamine

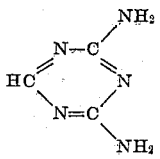

triamino triazine (i. e., melamine)

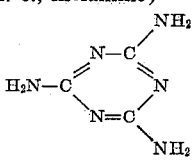

or a diguanamine, such as gamma-methyl-gamma-acetyl pimeloguanamine

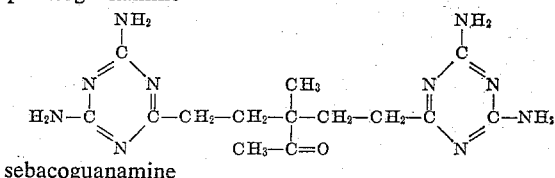

sebacoguanamine

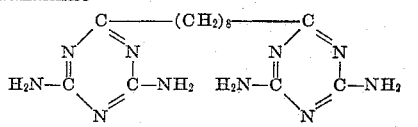

adipoguanamine

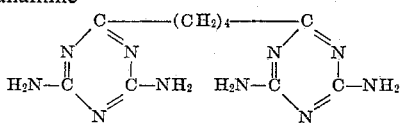

bis-(4,6-diamino-2-triazinyl-ethyl) fluorene

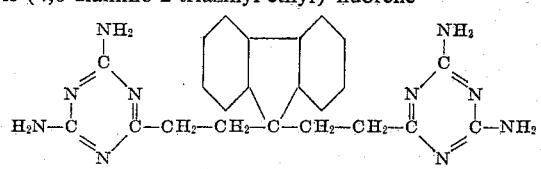

gamma-isopropenyl-gamma-acetyl pimeloguanamine

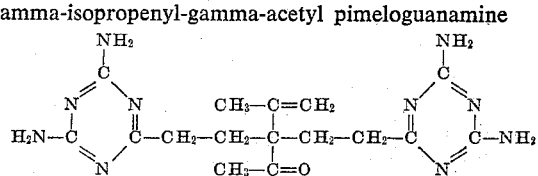

diphenyladipoguanamine

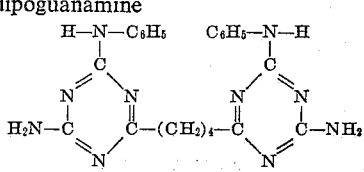

diphenylsebacoguanamine, di-p-phenetyladipoguanamine, or di-o-tolyladipoguanamine.

The first five diguanamines hereinbefore mentioned may be considered to be derivatives of dicarboxylic acids. Such diguanamines, as well as other diguanamines in which the exocyclic nitrogen atoms are unsubstituted may be produced by condensing with dicyandiamide the dinitrile corresponding to a dicarboxylic acid such as any normal aliphatic dicarboxylic acid in the series from malonic acid to octadecane 1,18-dicarboxylic acid, or fumaric acid, or any benzene dicarboxylic acid, or any naphthalene dicarboxylic acid, or any cyclohexane dicarboxylic acid, or the dimer of linoleic acid. The condensation of the dinitrile with dicyandiamide is carried out by dissolving a strongly basic catalyst in a suitable primary or secondary alcoholic solvent such as benzyl alcohol or ethylene glycol mono-methyl ether, adding the dinitrile and from about 2.2 to about 2.6 moles of dicyandiamide for each mole of the dinitrile, and heating to start the reaction. The reaction is then continued by heating or cooling if necessary to keep the temperature between about 100° C. and about 180° C. and to prevent the reaction from becoming too violent. The quantity of the alcoholic solvent used should be just sufficient to form a suspension of the precipitate that can be stirred during the reaction. When precipitation of the diguanamine is complete, the precipitate is filtered off and washed with boiling water to remove excess dicyandiamide and products of side reactions. The diguanamine may be purified by converting it to a hydrochloride and neutralizing an aqueous solution of the hydrochloride to liberate the diguanamine.

This method of preparation is versatile in that a large variety of dinitriles may be used for the reaction with dicyandiamide, to give a wire variety of diguanamines.

The dinitriles may be prepared by various methods. Dinitriles in which the cyano groups are separated by five carbon atoms in series, and in which the central carbon atom of the series is disubstituted, may be prepared by condensing acrylonitrile and a compound having an active methylene group, in the presence of a strong base. Other dinitriles may be prepared by reacting a polymethylene dihalide with sodium cyanide. Often it is convenient to prepare the dinitrile by dehydration of the diamide or directly from the dicarboxylic acid.

Diguanamines in which one or two of the exocyclic nitrogen atoms are substituted, as, for example, the last four diguanamines hereinbefore mentioned, may be prepared by various methods. One method consists in reacting 1-phenyl biguanide, 1-o-tolyl biguanide, 1-m-tolyl biguanide, 1-p-tolyl biguanide, 1-(2,5-dimethyl phenyl) biguanide, 1-methyl-1-phenyl biguanide, 1-p-phenetyl biguanide or 1-ethyl-1-phenyl biguanide with sodium carbonate, and adipyl chloride or the dichloride of any other dicarboxylic acid in chlorobenzene. Another method consists in reacting any of the aforementioned aryl or alkyl aryl biguanides, or 1-methyl biguanide, 1-ethyl biguanide, 1-propyl biguanide, 1-butyl biguanide, 1-allyl biguanide, 1-crotyl biguanide, 1,1-dimethyl biguanide, 1,1-diethyl biguanide or 1,1-diallyl biguanide, with the diethyl or dimethyl ester of adipic acid or any other dicarboxylic acid in the presence of an alkoxide catalyst. Still another method consists in reacting an aryl dicyandiamide such as phenyl dicyandiamide with adiponitrile or the dinitrile of any other dicarboxylic acid.

It is preferable that a plasticized composition embodying the invention comprise an alkoxy-substituted reaction product of formaldehyde with urea or melamine. It is most desirable that a composition of the invention comprise an alkoxy-substituted reaction product of formaldehyde with melamine.

In general, the proportion of formaldehyde actually reacting with a substance whose molecule has a plurality of NH₂ groups each connected to a carbon atom which in turn is connected by a double bond to a nitrogen or oxygen atom (for the sake of brevity, hereinafter referred to as "a substance having a plurality of NH₂ groups") may range from an equimolecular proportion up to a maximum of two molecules for each NH₂ group. (An excess of formaldehyde above this maximum may be used for the reaction if desired, any uncombinable excess being recovered by distillation, as hereinafter discussed.) The preferred proportions vary, of course, with the specific substance that is reacted with formaldehyde. For example when the substance is urea, the preferred proportions are about 3 mols of formaldehyde for every 2 mols of urea, and when the substance is melamine, the preferred proportions are about 3 mols of formaldehyde for each mol of melamine. Other examples of preferred molar ratios of formaldehyde to substances hereinbefore described, in the alkoxy-substituted reaction products used in the practice of the invention, are 2:1 for guanazole or 1-carbamylguanazole, 2:1 for ethylene diurea or propylene diurea, 2.5:1 for diethylene glycol dicarbamate, 4:1 for 2,4-diamino-6-hydroxy pyrimidine, 3:1 for 2,4-diamino quinazoline, 2:1 for formoguanamine, acetoguanamine or benzoguanamine and 5:1 for adipoguanamine or sebacoguanamine.

The procedure for preparing an alkoxy-substituted formaldehyde reaction product which may be used in the practice of the invention varies in accordance with the properties of the substance having a plurality of NH₂ groups, as hereinbefore defined. In general, the reaction of formaldehyde (i. e., to form a methylol compound) with a substance such as urea or a urethane (e. g., triethylene glycol dicarbamate), may be conducted by mixing aqueous formaldehyde with such substance at normal temperatures, but heating (e. g., at a temperature of about 30 degrees C. for about six hours) ordinarily is desirable to shorten the time of reaction, or, in some cases, to dissolve the substance to be reacted with formaldehyde. An alcohol, as hereinafter described, may then be added to the aqueous solution of the formaldehyde reaction product to form a solution of the product in the alcohol. When the mixture is distilled (usually under vacuum) to remove substantially all the water and any uncombined excess of formaldehyde, alkoxy groups derived from the alcohol replace hydroxy groups of the methylol compound, so that the residue remaining after the distillation comprises an alkoxy-substituted formaldehyde reaction product.

If the formaldehyde reaction product is insoluble in the alcohol-water solution, most of the water may be distilled from the aqueous solution of the product before adding the alcohol. After the addition of the alcohol, the mixture may be heated to dissolve the reaction product in the alcohol. The last traces of water may then be removed by distillation.

When there is any tendency for the condensation to proceed too far in aqueous solution so that the resulting formaldehyde reaction product is insoluble in the alcohol, the condensation to form a methylol compound and the conversion of the methylol compound to an alkoxy-substituted reaction product should be conducted as rapidly as possible. For example, when the substance having a plurality of NH₂ groups is melamine, a guanamine, a diguanamine or a hydroxy-substituted diurea (e. g., hydroxytrimethylene diurea), such substance may be refluxed in admixture with aqueous formaldehyde and an alcohol until a homogeneous solution forms (e. g., from one-half to three hours at temperatures ranging from about 80 to 90 degrees C.) before adding more alcohol (for reasons hereinafter explained) and distilling the mixture to remove water.

A weak acid such as phthalic, maleic or oxalic acid is ordinarily used as a catalyst during the conversion of the methylol compound to the alkoxy-substituted reaction product. The amount of the acid is usually sufficient to lower the pH of the alcohol solution to 3 or 4. Usually the pH during the formation of the methylol derivative should be at least 7 and may be as high as 8 or 9, and a basic catalyst such as sodium hydroxide or triethanolamine may be used during this step. The particular acid employed during the conversion of the methylol derivative to the alkoxy-substituted reaction product and the quantity are governed by the specific base and its quantity employed during the formation of the methylol derivative. Triethanolamine is a desirable basic catalyst, since it can be used with weaker acids. When combinations of catalysts that form sodium salts are used, the salts tend to appear as precipitates in the final solutions so that sodium hydroxide may be less desirable than triethanolamine as a basic catalyst.

An alcohol used in the preparation of the alkoxy-substituted formaldehyde reaction product preferably is one in which the formaldehyde reaction product (as hereinbefore described) is soluble.

As the solution of the formaldehyde reaction product is distilled to remove water, alkoxy groups derived from the alcohol replace the hydroxy groups of the methylol compound to form the alkoxy-substituted reaction product. The removal of all traces of water from the alkoxy-substituted formaldehyde reaction product is desirable since the presence of water reduces the compatibility of an alcohol solution of such reaction product with the cheap hydrocarbon thinners that are usually used in coating compositions. Thus, it is preferable that the alcohol also be capable of driving off water from the solution. Preferably, the alcohol is one having a boiling point substantially above 100 degrees C., although it may be one that forms with water a solution having a boiling point substantially below the boiling point of the alcohol; such an alcohol forms a solution with water which as it evaporates gives off a vapor in which the proportion of water is higher than the proportion of water in the solution. Thus the concentration of water in the alcohol solution of the alkoxy-substituted reaction product continuously decreases, so that the alcohol may be said to drive off the water as the evaporation proceeds.

Alcohols which may be used in the preparation of the alkoxy-substituted reaction product include primary aliphatic alcohols whose molecules contain from one to twelve carbon atoms (e. g., methanol, ethanol, 1-propanol, 1-butanol, isobutyl alcohol, 1-pentanol, isoamyl alcohol, 1-hexanol, 1-heptanol and 1-octanol). Preferably the alcohol used is one whose molecule contains at least three and not more than eight carbon atoms. Most desirably, the alcohol used is one whose molecule contains not more than five carbon atoms. The preferred alcohols are 1-butanol and isobutyl alcohol, which boil at temperatures above 100 degrees C., i. e., 117 degrees C. and 108 degrees C., respectively. The recovery of these butyl alcohols from the distillate during the distillation to remove water is facilitated by the fact that they are not miscible in all proportions with water so that a layer of water separates from the initial fractions of the distillate and may be discarded.

A proportion of the alcohol sufficient to drive off the water from the solution of the formaldehyde reaction product may be added along with the initial proportion of the alcohol required to dissolve the formaldehyde reaction product (and replace the hydroxy groups of the methylol compound). When the formaldehyde reaction product is formed in the presence of the alcohol, the excess of the alcohol required to drive off the water may be added just before the distillation to remove water. It is preferable not only that the proportion of the alcohol be sufficiently large to condense with the hydroxy groups of the methylol compound to form an alkoxy-substituted formaldehyde reaction product, and to drive off the water from such product, but also that some free alcohol remain in the final composition (i. e., alcohol which is not in chemical combination with the reaction product of formaldehyde and one of the substances having a plurality of NH₂ groups). Ordinarily, a total amount of approximately five to ten parts of the alcohol is used for each part of the substance having a plurality of NH₂ groups, in the preparation of an alkoxy-substituted formaldehyde reaction product, and it is usually desirable after distilling water from the solution of the product that excess alcohol be distilled until the proportion of free alcohol in the final solution of the alkoxy-substituted formaldehyde reaction product is approximately 25 to 50 percent. (As used herein, the terms "percent" and "parts" mean percent and parts by weight, unless otherwise specified.)

The proportion of the alcohol that is chemically combined in the alkoxy-substituted formaldehyde reaction product may range from one-half to one mol for each mol of formaldehyde which was actually reacted with the substance having a plurality of NH₂ groups. Preferably the reaction product comprises one mol of chemically combined alcohol for each mol of combined formaldehyde.

Along with the alcohols hereinbefore described, other alcohols may also be used in small amounts in the preparation of an alkoxy-substituted formaldehyde reaction product, but the proportion of such alcohols should be such that in the final solution of the product they comprise not more than approximately 2 to 5 percent of the total amount of free alcohols. Alcohols which may be present in such small amounts in the final solution include glycol ethyl ether, glycol butyl ether, glycol monomethyl ether, diethyleneglycol ethyl ether and diethyleneglycol butyl ether.

When the condensation of formaldehyde with a substance having a plurality of NH₂ groups is conducted in aqueous solution, after a homogeneous solution forms, it may be spray-dried or evaporated on an atmospheric or vacuum drum drier, so that the amount of water that must be removed during the formation of the alkoxy-substituted reaction product is reduced. The spray-dried material may then be dissolved in an alcohol. Strongly acid methanol is an excellent solvent for the spray-dried material. However, during evaporation to remove the last traces of water and to obtain a solution having the desired solids concentration, the methanol will evaporate with the water. Therefore, an alcohol such as n-butanol should be used along with the methanol, the n-butanol remaining after the distillation. The advantage of using methanol even though it is not present in the final alkoxy-substituted reaction product solution is that a smaller quantity of n-butanol is required to dissolve the product when methanol is also used, reducing the amount of solvent that must be evaporated to produce a solution of an alkoxy-substituted product having the desired concentration.

A plasticized composition embodying the invention may be produced by mixing at ordinary atmospheric temperatures (a) a solution of an alkoxy-substituted reaction product of formaldehyde with a substance whose molecule has a plurality of NH₂ groups each connected to a carbon atom which in turn is connected by a double bond to a nitrogen or oxygen atom (as hereinbefore described) with (b) a monomeric ester of components comprising (1) an aliphatic monocarboxylic acid whose molecule has at least four carbon atoms and (2) a substance whose molecule has at least three alcoholic hydroxy groups; the monomeric ester (b) being compatible with the alkoxy-substituted reaction product (a) and having in its molecule at least two free alcoholic hydroxy groups of the substance (2). (Compatibility of components (a) and (b) is evidenced, for example, by the formation of a clear composition upon mixing these substances and by the production of clear films when the composition is baked.)

PLASTICIZING ESTER

For the sake of brevity, the monomeric ester, (b), is hereinafter referred to as a "plasticizing ester." Although a plasticizing ester is defined as a monomeric ester of components comprising (1) an aliphatic monocarboxylic acid whose molecule has at least four carbon atoms and (2) a substance whose molecule has at least three alcoholic hydroxy groups, such definition is intended to explain the structure of the plasticizing ester and is not intended to limit the starting materials from which the plasticizing ester is prepared or to limit the method of preparation. For example, the first step in the preparation of a plasticizing ester may consist in reacting a substance whose molecule has at least three alcoholic hydroxy groups with an ester of an aliphatic monocarboxylic acid whose molecule has at least four carbon atoms and a lower alcohol. In such a reaction the substance whose molecule has at least three alcoholic hydroxy groups displaces the lower alcohol to form an ester of the substance whose molecule has at least three alcoholic hydroxy groups and the aliphatic monocarboxylic acid. The latter ester is properly defined as an ester of components comprising a substance whose molecule has at least three alcoholic hydroxy groups and an aliphatic monocarboxylic acid, even though a free aliphatic monocarboxylic acid was not used in its preparation.

A plasticizing ester that is used in the practice of the invention is a partial ester whose molecule has at least two free alcoholic hydroxy groups derived from the substance whose molecule has at least three alcoholic hydroxy groups. The free hydroxy groups in the molecule of the partial ester may all be derived from a single molecule of such a substance, or each hydroxy group may be derived from a different molecule of such a substance.

The term "monomeric ester" is used herein to distinguish the plasticizing esters which are essential components of compositions of the invention from polymeric esters. For example, an ester whose molecule consists of three fatty acid monoglyceride residues joined by two dicarboxylic acid residues is not within the scope of the invention because it is a polymeric ester. Such a polymeric ester would be relatively ineffective as a plasticizer. On the other hand, an ester whose molecule consists of two fatty acid monoglyceride residues joined by a dicarboxylic acid residue is included within the term "monomeric ester," as used herein, and may be used as a plasticizing ester in a composition embodying the invention (as is hereinafter further discussed).

The term "aliphatic monocarboxylic acid whose molecule has at least four carbon atoms" is used herein to include any substance whose molecule consists of a straight or branched chain monovalent aliphatic hydrocarbon radical, having saturated or unsaturated —C—C— bonds and having from 3 to 17 carbon atoms, attached to a carboxy group (i. e., an unsubstituted aliphatic monocarboxylic acid), or any such substance in which from 1 to 2 hydrogen atoms in the aliphatic radical have been replaced with hydroxy or amino radicals, or halo radicals having an atomic weight between 35 and 80 (i. e., chlorine and bromine).

Unsubstituted aliphatic monocarboxylic acids which may be used in the preparation of the plasticizing ester include saturated fatty acids in the series from butyric to stearic and unsaturated fatty acids having from 4 to 18 carbon atoms (i. g., butenic, oleic, palmitolic, stearolic, sorbic, linoleic, 3-butynoic and linolenic acids).

Examples of substituted aliphatic monocarboxylic acids which may be used in the preparation of the plasticizing ester include: β-hydroxybutyric acid, β,γ-dihydroxybutyric acid, α-aminovaleric acid, norleucine, lysine, threonine, and α-chlorobutyric acid.

The term "alcoholic hydroxy group" is used herein to mean a hydroxy group which is attached to an aliphatic carbon atom (as distinguished from a phenolic hydroxy group which is a hydroxy group that is attached to a carbon atom contained in an aromatic nucleus). A substance whose molecule has at least three alcoholic hydroxy groups, which can be used in the preparation of a plasticizing ester, may be any substance whose molecule may be considered to be derived by replacing three or more hydrogen atoms attached to different carbon atoms in the molecule of an aliphatic hydrocarbon with hydroxy radicals. The aliphatic hydrocarbon may be a straight or branched chain alkane having from three to twelve carbon atoms (i. e., propane, butane, isobutane or any alkane having from five to twelve carbon atoms). A substance whose molecule contains at least three alcoholic hydroxy groups which may be used in the present invention is hereinafter referred to as a "polyhydroxy alkane." Such substances include: glycerol, erythritol, arabitol, mannitol, sorbitol, iditol, volemitol, 1,2,3-butanetriol, 1,2,5-pentanetriol, 2,3,4-pentanetriol, 2,3,4-trimethyl - 2,3,4 - pentanetriol, 1,2,6 - hexanetriol, 3,4,5-trimethyl-3,4,5-heptanetriol and 1,2,3-trimethylol propane. Preferably the polyhydroxy alkane used in the practice of the invention contains not more than six carbon atoms.

A plasticizing ester that can be mixed with an alkoxy-substituted reaction product to produce a plasticized composition of the invention may be prepared by reacting one of the aliphatic monocarboxylic acids hereinbefore described (or a mixture thereof) with one of the polyhydroxy alkanes hereinbefore described (or a mixture thereof), in such proportions that the molecule of the product contains at least two unesterified alcoholic hydroxy groups derived from the polyhydroxy alkane. The reaction may be conducted by any of the procedures commonly employed in the preparation of such partial esters. That is, a mixture of an aliphatic monocarboxylic acid and a polyhydroxy alkane may be heated to a temperature between about 200 and about 350 degrees C. It is desirable that this heating be carried out in an inert atmosphere (e. g., of nitrogen or carbon dioxide), and the inert gas can conveniently be bubbled through the reaction mixture to effect stirring. The material is maintained at the reaction temperature for a time sufficiently long that the acid number is not higher than 10, and preferably for a time sufficiently long to obtain an acid number below 3; usually the time is not shorter than about four hours, and not longer than about eight hours, varying, of course, with the temperature.

It is preferred that the plasticizing ester used in the present invention be an ester of components comprising an aliphatic monocarboxylic acid which is unsubstituted (i. e., a fatty acid). It is preferred also that the plasticizing ester used in the present invention be an ester of components comprising glycerol. Many fatty acids are available commercially as their glycerol esters, which are oils derived from natural sources; examples of oils that provide sources for fatty acids include coconut oil, palm kernel oil, babussu oil, murmuru oil, palm oil, rape seed oil, mustard seed oil, olive oil, peanut oil, sesame oil, corn oil, cottonseed oil, soybean oil, sunflower oil, walnut oil, linseed oil, perilla oil, tung oil, oiticica oil, whale oil and menhaden oil. Beef tallow, lard and sardine and herring oils also are sources of fatty acids. If desired, the plasticizing ester may be prepared by reacting a fatty acid ester of a polyhydroxy alkane (e. g., cottonseed oil, linseed oil and soybean oil, which are primarily tri-esters of glycerol) with a polyhydroxy alkane in such proportions that the molecule of the product contains at least two unesterified alcoholic hydroxy groups derived from the polyhydoxy alkane. Such a reaction may be carried out in accordance with any commonly employed procedure for conducting such an exchange reaction. Usually the reaction is conducted under an inert atmosphere in the presence of a catalyst such as calcium naphthenate, the mixture of oil and polyhydroxy alkane being heated for approximately three hours at a temperature below about 250 degrees C. (e. g., 230 to 240 degrees C.).

It is desirable that the plasticizing ester used in the practice of the invention be one in which the aliphatic monocarboxylic acid component is a drying oil fatty acid, i. e., a fatty acid whose molecule contains two or three pairs of doubly bonded carbon atoms (e. g., linoleic and linolenic acids). It is most desirable that the plasticizing ester be a monoglyceride of a drying oil fatty acid. The glycerol esters of drying oil fatty acids are present in drying oils such as dehydrated castor oil, linseed oil, tung oil, poppy oil and hempseed oil. Compositions of the invention in which the plasticizing ester is derived from components comprising a polyhydroxy alkane and a drying oil fatty acid can be used in the production of coating compositions which dry rapidly in the presence of air.

Plasticizing esters which may be used in the practice of the present invention include: the alpha- and beta-monoglycerides of saturated fatty acids in the series from butyric to stearic, such as α- and β-monobutyrins, α- and β-monocaproins, α- and β-monolaurins, α- and β-monomyristins, α- and β-monopalmitins, α- and β-monostearins, and α- and β-monocaprylins, the monoglycerides of unsaturated fatty acids having from 4 to 18 carbon atoms, such as α-monoolein, coconut oil monoglycerides, linseed oil monoglycerides and soybean oil monoglycerides; the fatty acid monoesters of pentaerythritol such as the monolaurate, the monomyristate, and the monopalmitate, and the fatty acid monoesters of arabitol, such as the monoester of D-arabitol and margaric acid.

A plasticizing ester that is used in the practice of the invention may be an ester of components comprising other substances in addition to the aliphatic monocarboxylic acid and the polyhydroxy alkane. Of course, the proportion of any additional ingredients must be such that the resulting ester is a monomeric ester having in its molecule at least two free hydroxy groups derived from the polyhydroxy alkane.

For example, a plasticizing ester that is used in the practice of the invention may be an ester obtained from the reaction, by any of the procedures hereinbefore described for the preparation of a plasticizing ester, of two molecules of an ester of an aliphatic monocarboxylic acid with a polyhydroxy alkane, having two free hydroxy groups per molecule (e. g., a monoglyceride of a fatty acid) and one molecule of a dicarboxylic acid. The dicarboxylic acid may be (a) any substance whose molecule consists of a divalent straight or branched chain aliphatic hydrocarbon radical, having saturated or unsaturated —C—C— bonds and having from 2 to 20 carbon atoms, attached to two carboxy groups, or any such substance in which one or two hydrogen atoms in the divalent aliphatic radical have been replaced with hydroxy or amino radicals or (b) any substance whose molecule consists of a divalent aryl radical having a total of not more than ten nuclear and side chain carbon atoms, attached to two carboxy groups. Dicarboxylic acids as defined in (a) include saturated aliphatic dicarboxylic acids in the series from oxalic to roccellic; unsaturated aliphatic dicarboxylic acids in the series from fumaric to cetylmalonic; amino acids such as aspartic acid and glutamic acids; and hydroxy dicarboxylic acids such as malic acid and tartaric acid.

Dicarboxylic acids as defined in (b) above include any aromatic dicarboxylic acid in which the aryl radical has a total of not more than ten nuclear and side chain carbon atoms, the side chains, if any, consisting of not more than four primary, secondary or tertiary alkyl radicals having a total of not more than four carbon atoms, and any nuclear substituents consisting of not more than four halogen atoms having an atomic weight between 35 and 80. Such aromatic dicarboxylic acids include: phthalic acid, isophthalic acid, terephthalic acid, naphthalic acid, 4-methylisophthalic acid and tetra-chloro-phthalic acid.

A plasticizing ester which is used in a plasticized composition embodying the invention may be a monomeric ester of components comprising a polyhydroxy alkane and an unsaturated aliphatic monocarboxylic acid that has been styrenated. When an ester such as dehydrated castor oil monoglyceride is heated with styrene (e. g., for about four hours at temperatures ranging from about 150 to 200 degrees C.) in the presence of a peroxide catalyst it is believed that the styrene reacts with the partial ester by forming a chain attached at one point (i. e., at a point of unsaturation in the partial ester molecule). The styrenation of a monomeric ester which is used as a plasticizer in the present invention often improves the properties (e. g., resistance to brine solutions) of compositions of the invention prepared from such an ester. A modifying substance such as styrene preferably comprises not more than 25 percent of the total plasticizing ester and most desirably comprises from 10 to 20 percent of the total plasticizing ester.

The proportion of plasticizing ester in a plasticized composition embodying the invention may be as low as 5 percent or as high as 50 percent of the total composition, and the proportion of alkoxy-substituted formaldehyde reaction product may range from 25 to 95 percent of the total composition. The preferred proportion of plasticizing ester varies in accordance with the particular substance having a plurailty of NH2 groups which is used in the preparation of the alkoxy-substituted formaldehyde reaction product. In general, however, the preferred proportion of plasticizing ester in a composition of the invention is approximately 20 to 30 percent of the total composition, and the preferred proportion of alkoxy-substituted formaldehyde reaction product is from 30 to 60 percent of the total composition.

When a plasticizing ester, as hereinbefore defined, is mixed with an alkoxy-substituted formaldehyde reaction product and a sample of the resulting composition is heated (e. g., at a temperature of about 150 degrees C.), it is believed that the unesterified alcoholic hydroxy groups in the molecules of the plasticizing ester undergo an ester-interchange reaction with the alkoxy groups in the molecules of the alkoxy-substituted reaction product, with the formation of —C—O—C— bonds and the liberation of alcohol molecules. Thus, just as alkoxy radicals apparently replace hydroxy groups of the methylol derivative during distillation to remove water in the preparation of the alkoxy-substituted reaction product, it is believed that plasticizing ester radicals replace alkoxy groups as the alcohol evaporates during the baking of a composition embodying the invention. A composition of the invention is curable, since the fact that there are at least two free hydroxy groups in the plasticizing ester molecule enables the ester to cross-link the molecules of the formaldehyde reaction product. If the plasticizing ester contained only one free hydroxy group it would form an end-blocking group and would not act as a cross-linking agent, so that a composition comprising such an ester would not be curable. Although a substance such as ethylene glycol which has two free hydroxy groups in its molecule can be mixed with an alkoxy-substituted reaction product to produce a curable composition, such a composition does not contain a plasticizing radical derived from one of the aliphatic monocarboxylic acids hereinbefore described, and such a composition is thus not a plasticized composition. Furthermore, ordinary low molecular weight glycols are volatile and evaporate as a coating composition cures, and higher glycols do not react properly and are not compatible with alkoxy-substituted formaldehyde reaction products.

In the production of a plasticized composition embodying the invention, a plasticizing ester (as hereinbefore defined) may be mixed with a solution of an alkoxy-substituted formaldehyde reaction product. As hereinbefore stated, a solution of an alkoxy-substituted reaction product after the distillation of water and excess alcohol may comprise a concentration of 50 to 75 percent solids and 25 to 50 percent free alcohol. However, when a plasticized composition of the invention is to be used for the production of coatings, it is desirable that the solids concentration of the solution of the alkoxy-substituted reaction product be further reduced by addition of a thinner (as described hereinafter) to approximately 45 to 50 percent. A composition of the invention comprising such a solution, and a plasticizing ester of a drying oil fatty acid, in the proportions hereinbefore described, when mixed with a drier such as a mixture of lead and cobalt naphthenates (in an amount consistent with the function of such substances as drying catalysts), may be used in the production of clear coatings having good flexibility and adherence. Since an alcohol alone is too expensive to use as a thinner, it is desirable to dilute further an alcohol solution of an alkoxy-substituted formaldehyde reaction product to a concentration of about 45 to 50 percent solids with a hydrocarbon solvent such as xylene, toluene or petroleum naphtha. (Such a hydrocarbon thinner cannot be used alone as a solvent for an alkoxy-substituted formaldehyde reaction product, since an alcohol is required for compatibility of the hydrocarbon with the alkoxy-substituted formaldehyde reaction product.)

Plasticized compositions of the invention may be ground with suitable pigments (e. g., titanium dioxide) in the production of baking enamels.

In addition to the alkoxy-substituted formaldehyde reaction product and plasticizing ester, a plasticized composition of the invention may contain other non-volatile substances which are compatible with the alkoxy-substituted formaldehyde reaction product, such as alkyd resins and resinous varnish materials (e. g., phenolic resins, natural resins, phenol- and maleic-modified ester gum resins, etc.), as well as pigments (i. e., non-volatile substances which are not compatible with the alkoxy-substituted formaldehyde reaction product). (An ingredient of a composition of the invention is considered herein to be non-volatile if less than 10 percent of the ingredient evaporates when the composition is baked at a temperature as high as 350 degrees F. for 30 minutes. Thus the term "non-volatile" distinguishes such an ingredient from, for example, a solvent which is substantially (at least 90 percent) evaporated upon such treatment.) When, however, a composition of the invention contains other non-volatile substances in addition to the alkoxy-substituted formaldehyde reaction product and plasticizing ester, the latter two ingredients should comprise at least 55 percent of the total amount of non-volatile substances which are compatible with the alkoxy-substituted formaldehyde reaction product. It is preferred that the alkoxy-substituted formaldehyde reaction product and the plasticizing ester comprise at least 70 percent of the total amount of non-volatile, compatible ingredients.

Heretofore, an alkoxy-substituted reaction product of formaldehyde with urea, when used as the principal ingredient in a coating composition, has produced coatings that are extremely brittle. In order to obtain commercially useful coatings it has been necessary to incorporate as a plasticizer at least two parts of an alkyd resin for each part of the alkoxy-substituted reaction product, thus sacrificing many of the good properties of urea-formaldehyde resins that can be obtained with more predominant proportions of such resins. The fact that approximately two parts of an alkyd resin are required for each part of an alkoxy-substituted urea-formaldehyde reaction product in order to obtain commercially useful coatings may be demonstrated as follows:

An alkoxy-substituted urea-formaldehyde reaction product is prepared by the following procedure: Formalin (19.4 parts of an aqueous solution comprising 37.0% formaldehyde) is adjusted to a pH of 7.5 with a dilute aqueous solution of sodium hydroxide, urea (7.2 parts) is added to the resulting solution and the entire mixture is stirred to effect complete solution. This solution of formalin and urea is allowed to stand at about 70° F. for approximately 48 hours. During this time a solid magma of dimethylol urea crystals forms. The dimethylol urea crystals are dried by washing with an equal weight of acetone which is separated by filtration. Oxalic acid (0.24 part) and 1-butanol (71.25 parts) are placed in a distillation flask and the dry dimethylol urea crystals are added. The flask is heated at 70° C. for 30 minutes and then the mixture is distilled under vacuum until 25 percent of the original weight of the mixture charged into the distillation flask remains. The residue in the flask is then diluted with xylene to a 50 percent solids concentration.

An alkyd resin is prepared by the following procedure: A mixture of phthalic anhydride (37.45 parts), dehydrated castor oil fatty acids (33.53 parts), glycerine (27.7 parts) and maleic anhydride (1.32 parts) is placed in a 1 liter three-necked flask fitted with a thermometer, a stirrer, a condenser, and an inlet tube through which a moderate stream of carbon dioxide is passed over the mixture in the flask. The mixture is heated to a temperature of about 215 degrees C. and is held at that temperature for seven hours. The resulting resin is diluted to a 50 percent solids concentration with xylol.

An alkyd resin (25 parts of the alkyd resin solution prepared as described in the preceding paragraph) is mixed with an alkoxy-substituted reaction product (75 parts of the butoxy-substituted urea-formaldehyde reaction product solution prepared as hereinbefore described). A sample of the resulting clear solution is filmed on a tin panel, baked for one-half hour at a temperature of 300 degrees F. and then cooled to room temperature. When the panel is bent mechanically, the film cracks. A film on a tin panel of a composition comprising 25 parts of the alkoxy-substituted reaction product and 75 parts of the alkyd resin when baked for one-half hour at 300 degrees F., cooled to room temperature and subjected to a similar mechanical-bend test, adheres to the panel and bends without cracking. Thus, heretofore a flexible composition comprising an alkoxy-substituted urea-formaldehyde reaction product had to contain also an alkyd resin in a proportion of about two parts of alkyd for each part of the urea-formaldehyde reaction product. Although compositions containing such a large proportion of alkyd resin may be used to produce satisfactory coatings, such compositions cannot be used in coating the interior of a food container since phthalic anhydride is ordinarily a component of the alkyd resin used as a plasticizer, and alkyds made from phthalic anhydride impart an objectionable taste to food. In contrast to the heretofore known plasticized urea-formaldehyde reaction products, a plasticized composition of the invention may contain a comparatively low proportion of an effective plasticizer so that the good properties of a urea-formaldehyde resin are retained while the composition has sufficient flexibility to be commercially useful. Furthermore, a composition of the invention which contains no alkyd resin does not impart an objectionable taste to food and has the other properties required of a composition which is used to coat food containers, as is demonstrated by the following tests:

A plasticizing ester is prepared as follows: Dehydrated castor oil (1 mol), glycerine (2.1 mols) and a catalyst (2 grams of a solution consisting of 5 percent calcium naphthenate and 95 percent "Varnolene," a fraction obtained in the distillation of petroleum, boiling between 310 and 410 degrees F., which consists substantially of high boiling aliphatic hydrocarbons) are mixed in a flask fitted with a condenser and an inlet tube through which a moderate stream of carbon dioxide is passed over the surface of the reaction mixture. The mixture is heated at a temperature of 230 degrees C. until a sample of the mixture (3 parts) is compatible with methanol (1 part).

A plasticizing ester (25 parts of the dehydrated castor monoglyceride prepared as described in the preceding paragraph) is mixed with an alkoxy-substituted reaction product (75 parts of the butoxy-substituted urea-formaldehyde reaction product solution prepared as hereinbefore described) to form a clear solution. A sample of the composition when filmed on a glass plate and baked for fifteen minutes at a temperature of 300 degrees F. forms a clear flexible film.

Another sample of the composition is filmed on a tin panel, baked for one-half hour at a temperature of 300 degrees F. and then cooled to room temperature. When the panel is bent mechanically, the film adheres to the panel and bends without cracking. In order to test the endurance of the bent film under strain, the film-coated bent tin panel is baked for eighteen hours at a temperature of 120 degrees F. and is then cooled rapidly to below room temperature. The film is not cracked even after such a strenuous test.

Two more samples of the composition are each filmed on a tin panel, baked for one-half hour at a temperature of 300 degrees F. and then cooled to room temperature. When half of one panel is immersed in steam for thirty minutes, the film does not blush (i. e., upon comparison with the half of the panel which is not immersed, the half which is immersed in steam shows no milkiness). When half of the second panel is immersed for seven days in a solution consisting of 5 percent of acetic acid, 5 percent of sodium chloride and 90 percent of water, the film does not blush.

The following examples illustrate the practice of the invention.

*Example 1*

(a) An alkoxy-substituted reaction product of formaldehyde with urea is prepared by the following procedure: Formalin (19.4 parts of an aqueous solution comprising 37.0% formaldehyde) is adjusted to a pH of 7.5 with a dilute aqueous solution of sodium hydroxide, urea (7.2 parts) is added to the resulting solution and the entire mixture is stirred to effect complete solution. This solution of formalin and urea is allowed to stand at about 70° F. for approximately 48 hours. During this time a solid magma of dimethylol urea crystals forms. The dimethylol urea crystals are dried by washing with an equal weight of acetone which is separated by filtration. Oxalic acid (0.24 part) and 1-butanol (71.25 parts) are placed in a distillation flask and the dry dimethylol urea crystals are added. The flask is heated at 70° C. for 30 minutes and then the mixture is distilled under vacuum until 25 percent of the original weight of the mixture charged into the distillation flask remains. The residue in the flask is then diluted with xylene to a 50 percent solids concentration.

A plasticized composition embodying the invention is prepared by mixing at room temperature an alkoxy-substituted formaldehyde reaction product (75 parts of the butoxy-substituted urea-formaldehyde reaction product solution obtained by the procedure described in the preceding paragraph) with a plasticizing ester (25 parts of an ester obtained by heating 1 mol of soy bean oil, 2.1 mols of glycerine and 2 grams of a solution consisting of 5 percent calcium naphthenate and 95 percent Varnolene by the procedure hereinbefore described for the preparation of dehydrated castor monoglyceride).

(b) The procedure described in the second paragraph of (a) is repeated except that linseed oil is used in place of soy bean oil in the preparation of the plasticizing ester.

(c) The procedure described in (b) is repeated except that the proportion of butoxy-substituted urea-formaldehyde reaction product solution is 80 parts and the proportion of plasticizing ester is 20 parts.

(d) A plasticized composition embodying the invention is prepared by the procedure described in the second paragraph of (a) using 70 parts of the butoxy-substituted urea-formaldehyde reaction product solution and 30 parts of dehydrated castor monoglyceride (prepared as hereinbefore described).

(e) The procedure described in (d) is repeated except that the proportion of butoxy-substituted urea-formaldehyde reaction product solution is 80 parts and the proportion of plasticizing ester is 20 parts.

(f) The procedure described in the second paragraph of (a) is repeated except that China-wood oil is used in place of soy bean oil in the preparation of the plasticizing ester.

(g) The procedure described in (f) is repeated except that the proportion of butoxy-substituted urea-formaldehyde reaction product solution is 70 parts and the proportion of plasticizing ester is 30 parts.

(h) The procedure described in (f) is repeated except that the proportion of butoxy-substituted urea-formaldehyde product solution is 80 parts and the proportion of plasticizing ester is 20 parts.

Samples of the compositions prepared as described in paragraphs (a) through (h) are filmed on glass plates and baked for fifteen minutes at a temperature of 300 degrees F. to form clear flexible films. Other samples of the compositions are filmed on tin panels, baked for fifteen minutes at 300 degrees F. and cooled to room temperature. When the panels are bent mechanically, the films adhere to the panels and bend without cracking. The films do not crack even when the bent panels are baked for eighteen hours at a temperature of 120 degrees F. and then cooled rapidly to below room temperature. Films of the compositions on tin panels do not blush when immersed in steam for thirty minutes.

*Example 2*

(a) A plasticized composition of the invention is prepared by the procedure described in the second paragraph of Example 1 except that the plasticizing ester used is obtained by heating, in a flask fitted with a condenser and an inlet tube through which a stream of carbon dioxide is introduced, 1 mol of soya fatty acid with 1 mol of glycerine at a temperature of 235 degrees C. until the acid number is below 2.

(b) The procedure described in (a) is repeated using 1 mol of 1,2,3-trimethylol propane in place of glycerine in the preparation of the plasticizing ester.

(c) The procedure described in (a) is repeated using 1 mol of sorbitol in place of glycerine in the preparation of the plasticizing ester.

(d) The procedure described in (a) is repeated using 1 mol of pentaerythritol in place of glycerine and using 2 mols of soya fatty acid in the preparation of the plasticizing ester.

Films of the plasticized compositions prepared by the procedures described in paragraphs (a) through (d) baked on glass plates for thirty minutes at 300 degrees F. are clear and flexible, and films baked on tin panels for thirty minutes at 300 degrees F., when subjected to a mechanical bend test as hereinbefore described, do not crack.

*Example 3*

(a) A plasticizing ester is prepared as follows: Soya monoglyceride (2 mols of the soya monoglyceride prepared as described in Example 2 (a)) is heated with adipic acid (1 mol) using the apparatus and procedure described in Example 2 (a).

A plasticized composition of the invention is prepared by mixing at room temperature an alkoxy-substituted formaldehyde reaction product (50 parts of the butoxy-substituted urea-formaldehyde reaction product solution, prepared as described in the first paragraph of Example 1) and a plasticizing ester (50 parts of the plasticizing ester prepared as described in the preceding paragraph).

(b) The procedure described in the preceding paragraph is repeated except that the proportion of the butoxy-substituted urea-formaldehyde reaction product solution is 75 parts and the proportion of plasticizing ester is 25 parts.

(c) The procedure described in the second paragraph of (a) above is repeated except that the proportion of the butoxy-substituted urea-formaldehyde reaction product solution is 60 parts and the proportion of plasticizing ester is 40 parts.

Films of the compositions prepared as described in (a), (b) and (c) above baked on glass plates for fifteen minutes at 350 degrees F. are clear and flexible, and films baked on tin panels for fifteen minutes at 350 degrees F. do not blush when the panels are immersed in steam or in brine, and do not crack when the panels are subjected to a mechanical bend test, as hereinbefore described.

*Example 4*

A plasticizing ester (80 parts of dehydrated castor monoglyceride, prepared as hereinbefore described), styrene (20 parts) and benzoyl peroxide (1 part) are mixed and refluxed for two hours at a temperature of 150 degrees C.

A plasticized composition of the invention is prepared by mixing at room temperature a plasticizing ester (25 parts of the styrene-modified plasticizing ester prepared as described in the preceding paragraph) and an alkoxy-substituted formaldehyde reaction product (75 parts of the butoxy-substituted urea-formaldehyde reaction product solution prepared as hereinbefore described). Films of the composition baked on glass plates for thirty minutes at 300 degrees F. are clear and flexible, and films baked on tin panels for thirty minutes at 300 degrees F. and subjected to a mechanical bend test, as hereinbefore described, do not crack.

*Example 5*

(a) A plasticizing ester (2 mols of the soya 1,2,3-trimethylol propane ester prepared as described in Example 2 (b)) is heated with adipic acid (1 mol) at a temperature of 235 degrees C. in a flask fitted with a condenser and an inlet tube through which carbon dioxide is introduced, until the acid number approaches zero.

A plasticized composition of the invention is prepared by mixing at room temperature an alkoxy-substituted formaldehyde reaction product (75 parts of the butoxy-substituted urea-formaldehyde reaction product solution, prepared as hereinbefore described) and a plasticizing ester (25 parts of the ester prepared as described in the preceding paragraph).

(b) The procedure described in (a) is repeated, except that the plasticizing ester is heated with 1 mol of phthalic anhydride instead of adipic acid before it is mixed with the butoxy-substituted urea-formaldehyde reaction product solution.

(c) The procedure described in (a) is repeated except that the plasticizing ester is prepared by heating 2 mols of the soya pentaerythritol ester described in Example 2 (d) with 1 mol of phthalic anhydride.

(d) The procedure described in (c) is repeated except that tetra-chloro-phthalic anhydride is used in place of phthalic anhydride.

Films of the compositions prepared as described in (a), (b), (c) and (d), baked on glass plates for thirty minutes at 300 degrees F., are clear and flexible, and films baked on tin panels for thirty minutes at 300 degrees F. and subjected to a mechanical bend test, as hereinbefore described, do not crack.

*Example 6*

An alkoxy-substituted reaction product of formaldehyde with melamine is prepared by the following procedure:

A mixture of isobutyl alcohol (400 grams), melamine (63 grams), commercial formalin (243 grams of a methanol-free aqueous solution consisting of 37 percent formaldehyde and 63 percent water) and maleic anhydride (0.2 gram) is refluxed for three hours at a temperature of 92 degrees C. At the end of this refluxing period, isobutyl alcohol (200 grams) is added to the mixture, which is then filtered. The filtrate is then evaporated under vacuum until water no longer separates from the distillate (about two hours), and evaporation is then continued for ten minutes longer. The final solution is diluted with xylene to a 50 percent solids concentration.

A plasticized composition embodying the invention is obtained by mixing the isobutoxy-substituted melamine-formaldehyde reaction product solution prepared as described in the preceding paragraph (50 parts) with the soya monoglyceride (50 parts) prepared as described in Example 2(a). Films of the composition baked on glass plates for thirty minutes at a temperature of 300 degrees F. are clear and flexible, and films baked on tin panels for thirty minutes at 300 degrees F. and subjected to a mechanical bend test, as hereinbefore described, do not crack.

The following plasticizing esters may be substituted for the soya monoglyceride in the procedure described in the preceding paragraph to obtain plasticized compositions of the invention which form clear flexible films: a soya 1,2,3-trimethylolpropane ester, prepared as described in Example 2(b); a soya sorbitol ester, prepared as described in Example 2(c); a soya pentaerythritol ester, prepared as described in Example 2(d); and a soya pentaerythritol ester, prepared by heating 1 mol of soya fatty acid with 1 mol of pentaerythritol by the procedure described in Example 2(a).

Example 7

A plasticized composition of the invention is prepared by mixing at room temperature an alkoxy-substituted reaction product (50 parts of the isobutoxy-substituted melamine-formaldehyde reaction product solution, prepared as described in Example 6) and a plasticizing ester (50 parts of the adipic acid-modified soya 1,2,3-trimethylol propane ester prepared as described in Example 5(a)). Films of the composition baked on glass plates for thirty minutes at 300 degrees F. are clear and flexible, and films baked on tin panels for thirty minutes at 300 degrees F. and subjected to a mechanical bend test, as hereinbefore described, do not crack.

The following plasticizing esters may be substituted for the adipic acid-modified soya 1,2,3-trimethylol propane ester in the procedure described in the preceding paragraph to obtain plasticized compositions of the invention which form clear flexible films: a phthalic anhydride-modified soya 1,2,3-trimethylol propane ester (prepared by the procedure described in Example 5(b); a phthalic anhydride-modified soya pentaerythritol ester, prepared as described in Example 5(c); an adipic acid-modified soya pentaerythritol ester or a maleic anhydride-modified soya pentaerythritol ester, prepared by heating 2 mols of the soya pentaerythritol ester described in Example 2(d) with 1 mol of adipic acid or with 1 mol of maleic anhydride by the procedure described in Example 5(a); and a tetra-chloro-phthalic anhydride-modified soya pentaerythritol ester, prepared as described in Example 5(d).

Example 8

A mixture of adipoguanamine (34.5 grams), isobutyl alcohol (100 grams), commercial formalin (81 grams), and maleic anhydride (0.5 gram) is refluxed for three hours at a temperature of 92 degrees C. At the end of this time, isobutyl alcohol (200 grams) is added and the solution is filtered. The filtrate is placed in a distillation flask and evaporated under vacuum until only 32 percent of the original weight of the filtrate charged into the flask remains. Xylene is then added to dilute the residue in the flask to a 50 percent solids concentration.

A plasticized composition of the invention is prepared by mixing at room temperature an alkoxy-substituted formaldehyde reaction product (75 parts of the isobutoxy-substituted adipoguanamine-formaldehyde reaction product solution prepared as described in the preceding paragraph) and a plasticizing ester (25 parts of the soya monoglyceride prepared as described in Example 2(a)). Films of the composition baked on glass plates for thirty minutes at 300 degrees F. are clear and flexible, and films baked on tin panels for thirty minutes at 300 degrees F. and subjected to a mechanical bend test, as hereinbefore described, do not crack.

Example 9

A mixture of triethylene glycol dicarbamate (33 grams), commercial formalin (101 grams) and triethanolamine (2 cc. of a 50 percent aqueous solution) is warmed on a water bath at a temperature of 30 degrees C. for six hours. 1-butanol (200 cc.) and maleic anhydride (1.4 grams) are then added to the mixture. The homogeneous solution so obtained is distilled in vacuo until the residue remaining in the flask contains a concentration of 50 percent solids.

A plasticized composition embodying the invention is prepared by mixing at room temperature an alkoxy-substituted formaldehyde reaction product (75 parts of the butoxy-substituted triethylene glycol dicarbamate-formaldehyde reaction product solution, prepared by the procedure described in the preceding paragraph) and a plasticizing ester (25 parts of the soya monoglyceride prepared as described in Example 2(a)).

What is claimed is:

1. A coating composition comprising (A), as the principal-filming ingredients thereof, a 50–75 percent alkanol solution of an alkoxy-substituted reaction product of formaldehyde with a substance whose molecule has a plurality of $NH_2$ groups each connected to a carbon atom which in turn is connected by a double bond to an atom of the class consisting of oxygen and nitrogen and, as a plasticizer therefor in an amount equal to about one-third of said alkoxy-substituted reaction product, a compatible monomeric ester of components comprising (1) a drying oil fatty acid and (2) a substance whose molecule has at least three alcoholic hydroxy groups, the ester having in its molecule at least two of the free alcoholic hydroxy groups of substance (2); and (B) a hydrocarbon solvent in an amount sufficient to reduce the total solids content of the composition to 45–50 percent of the composition.

2. A coating composition comprising (A), as the principal film-forming ingredients, 50–75 percent alkanol solution of an alkoxy-substituted reaction product of formaldehyde with a substance whose molecule has a plurality of $NH_2$ groups each connected to a carbon atom which in turn is connected by a double bond to an atom of the class consisting of oxygen and nitrogen and, as a compatible plasticizer therefor in an amount ranging from 33⅓–100 percent of said alkoxy-substituted reaction product, a drying oil monoglyceride; and (B) a hydrocarbon solvent in an amount sufficient to reduce the total solids content of the composition to 45–50 percent of the composition.

3. A coating composition comprising (A), as the principal film-forming ingredients thereof, a 50–75 percent alkanol solution of an alkoxy-substituted melamine-formaldehyde reaction product and, as a plasticizer therefor in an amount equal to about one-third of said alkoxy-substituted reaction product, a compatible monomeric ester of components comprising (1) a drying oil fatty acid and (2) a substance whose molecule has at least three alcoholic hydroxy groups, the ester having in its molecule at least two of the free alcoholic hydroxy groups of substance (2); and (B) a hydrocarbon solvent in an amount sufficient to reduce the total solids content of the composition to 45–50 percent of the composition.

4. A coating composition comprising (A) as the principal film-forming ingredients thereof, a 50–75 percent butanol solution of a butoxy-substituted melamine-formaldehyde reaction product and, as a compatible plasticizer therefor in an amount ranging from 33⅓–100 percent of said butoxy-substituted reaction product, a drying oil monoglyceride; and (B) a hydrocarbon solvent in an amount sufficient to reduce the total solids content of the composition to 45-50 percent of the composition.

5. A coating composition comprising (A) as the principal film-forming ingredients thereof, a 50-75 percent butanol solution of a butoxy-substituted urea-formaldehyde reaction product and, as a compatible plasticizer therefor in an amount ranging from 33⅓-100 percent of said butoxy-substituted reaction product, a drying oil monoglyceride; and (B) a hydrocarbon solvent in an amount sufficient to reduce the total solids content of the composition to 45-50 percent of the composition.

6. A coating composition comprising (A) as the principal film-forming ingredients thereof, a 50-75 percent butanol solution of a butoxy-substituted melamine-formaldehyde reaction product and, as a compatible plasticizer therefore in an amount ranging from 33⅓-100 percent of said butoxy-substituted reaction product, a styrenated drying oil monoglyceride, prepared by heat-reacting a drying oil monoglyceride and 10-20 percent of its weight of styrene in the presence of a peroxide catalyst; and (B) a hydrocarbon solvent in an amount sufficient to reduce the total solids content of the composition to 45-50 percent of the composition.

7. A coating composition comprising (A), as the principal-filming ingredients thereof, a 50-75 percent alkanol solution of an alkoxy-substituted reaction product of formaldehyde with a substance whose molecule has a plurality of NH₂ groups each connected to a carbon atom which in turn is connected by a double bond to an atom of the class consisting of oxygen and nitrogen and, as a plasticizer therefor in an amount equal to about one-third of said alkoxy-substituted reaction product, a compatible monomeric ester of components comprising (1) a drying oil fatty acid and (2) a substance whose molecule has at least three alcoholic hydroxy groups, the ester having in its molecule at least two of the free alcoholic hydroxy groups of substance (2); (B) a metal drier for the drying oil fatty acid of the plasticizing ester; and (C) a hydrocarbon solvent in an amount sufficient to reduce the total solids content of the composition to 45-50 percent of the composition.

8. A coating composition comprising (A), as the principal film-forming ingredients, a 50-75 percent alkanol solution of an alkoxy-substituted reaction product of formaldehyde with a substance whose molecule has a plurality of NH₂ groups each connected to a carbon atom which in turn is connected by a double bond to an atom of the class consisting of oxygen and nitrogen and, as a compatible plasticizer therefor in an amount ranging from 33⅓-100 percent of said alkoxy-substituted reaction product, a drying oil monoglyceride; (B) a metal drier for the drying oil monoglyceride; and (C) a hydrocarbon solvent in an amount sufficient to reduce the total solids content of the composition to 45-50 percent of the composition.

9. A coating composition comprising (A), as the principal film-forming ingredients thereof, a 50-75 percent alkanol solution of an alkoxy-substituted melamine-formaldehyde reaction product and, as a plasticizer therefor in an amount equal to about one-third of said alkoxy-substituted reaction product, a compatible monomeric ester of components comprising (1) a drying oil fatty acid and (2) a substance whose molecule has at least three alcoholic hydroxy groups, the ester having in its molecule at least two of the free alcoholic hydroxy groups of substance (2); (B) a metal drier for the drying oil fatty acid of the plasticizing ester; and (C) a hydrogen solvent in an amount sufficient to reduce the total solids content of the composition to 45-50 percent of the composition.

10. A coating composition comprising (A) as the principal film-forming ingredients thereof, a 50-75 percent butanol solution of a butoxy-substituted melamine-formaldehyde reaction product and, as a compatible plasticizer therefor in an amount ranging from 33⅓-100 percent of said butoxy-substituted reaction product, a drying oil monoglyceride; (B) a metal drier for the drying oil monoglyceride; and (C) a hydrocarbon solvent in an amount sufficient to reduce the total solids content of the composition to 45-50 percent of the composition.

11. A coating composition comprising (A) as the principal film-forming ingredients thereof, a 50-75 percent butanol solution of a butoxy-substituted urea-formaldehyde reaction product and, as a compatible plasticizer therefor in an amount ranging from 33⅓-100 percent of said butoxy-substituted reaction product, a drying oil monoglyceride; (B) a metal drier for the drying oil monoglyceride; and (C) a hydrocarbon solvent in an amount sufficient to reduce the total solids content of the composition to 45-50 percent of the composition.

12. A coating composition comprising (A) as the principal film-forming ingredients thereof, a 50-75 percent butanol solution of a butoxy-substituted melamine-formaldehyde reaction product and, as a compatible plasticizer therefor in an amount ranging from 33⅓-100 percent of said butoxy-substituted reaction product, a styrenated drying oil monoglyceride, prepared by heat-reacting a drying oil monoglyceride and 10-20 percent of its weight of styrene in the presence of a peroxide catalyst, (B) a metal drier for the drying oil monoglyceride; and (C) a hydrocarbon solvent in an amount sufficient to reduce the total solids content of the composition to 45-50 percent of the composition.

References Cited in the file of this patent

UNITED STATES PATENTS

| Number | Name | Date |
|---|---|---|
| 1,996,911 | Eisenmann | Apr. 9, 1935 |
| 2,043,159 | Eisenmann | June 2, 1936 |
| 2,311,341 | Johnston | Feb. 16, 1943 |
| 2,448,338 | Widmer et al. | Aug. 31, 1948 |
| 2,524,727 | Dudley | Oct. 3, 1950 |

FOREIGN PATENTS

| Number | Country | Date |
|---|---|---|
| 556,829 | Great Britain | Oct. 25, 1943 |
| 598,961 | Great Britain | Mar. 2, 1948 |